United States Patent
Brown, Sr.

(10) Patent No.: US 9,982,712 B2
(45) Date of Patent: May 29, 2018

(54) QUICK DISCONNECT PILLOW BLOCK BEARING

(71) Applicant: Terry Michael Brown, Sr., Vincennes, IN (US)

(72) Inventor: Terry Michael Brown, Sr., Vincennes, IN (US)

( * ) Notice: Subject to any disclaimer, the term of this patent is extended or adjusted under 35 U.S.C. 154(b) by 34 days.

(21) Appl. No.: 15/371,940

(22) Filed: Dec. 7, 2016

(65) Prior Publication Data

US 2017/0321743 A1    Nov. 9, 2017

Related U.S. Application Data

(60) Provisional application No. 62/333,315, filed on May 9, 2016.

(51) Int. Cl.
*F16C 23/04* (2006.01)
*F16C 11/06* (2006.01)

(52) U.S. Cl.
CPC ...... *F16C 11/0695* (2013.01); *F16C 11/0614* (2013.01); *F16C 2226/62* (2013.01); *F16C 2326/58* (2013.01)

(58) Field of Classification Search
CPC .............. F16C 11/0614; F16C 11/0695; F16C 23/043; F16C 23/045; F16C 23/046; F16C 2226/62; F16C 2326/58; B65G 39/09
See application file for complete search history.

(56) References Cited

U.S. PATENT DOCUMENTS

| | | | | |
|---|---|---|---|---|
| 2,272,118 A * | 2/1942 | Imse | ..................... | F16C 23/045 384/206 |
| 3,160,449 A * | 12/1964 | Scott | ..................... | F16C 23/045 384/208 |
| 5,219,231 A * | 6/1993 | Sheedy | ................. | F16C 23/045 384/192 |
| 2013/0156355 A1 * | 6/2013 | Levsen | ................. | B65G 39/09 384/91 |

* cited by examiner

*Primary Examiner* — Phillip A Johnson
(74) *Attorney, Agent, or Firm* — Dunlap Bennett & Ludwig PLLC; Brendan E. Squire

(57) ABSTRACT

A quick release pillow block bearing assembly has end pieces, a center bearing housing carrying a bearing, and quick release pins for retaining the bearing housing with the end pieces. The invention enables replacement and or repair of the bearing and its counterparts easily, efficiently, and less often. The user need only remove the quick release pins remove the bearing housing and thereby gain access to the housing, which also provides access to the bearing/shaft and counterparts. Upon removal of the quick release pins, the center housing may be removed from the structure, while the end pieces stay in place, allowing one to remove and install the bearing quickly. It also enables removal of the shaft in seconds, thus permitting easy and quick replacement of worn sections of the bearing.

19 Claims, 5 Drawing Sheets

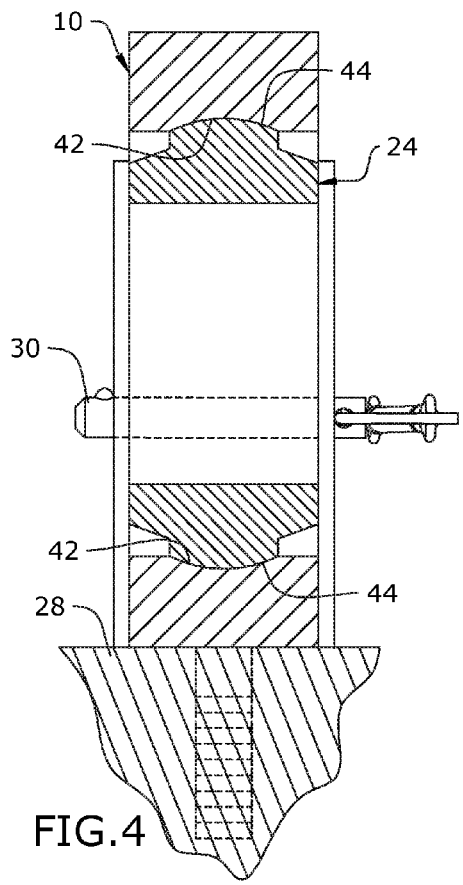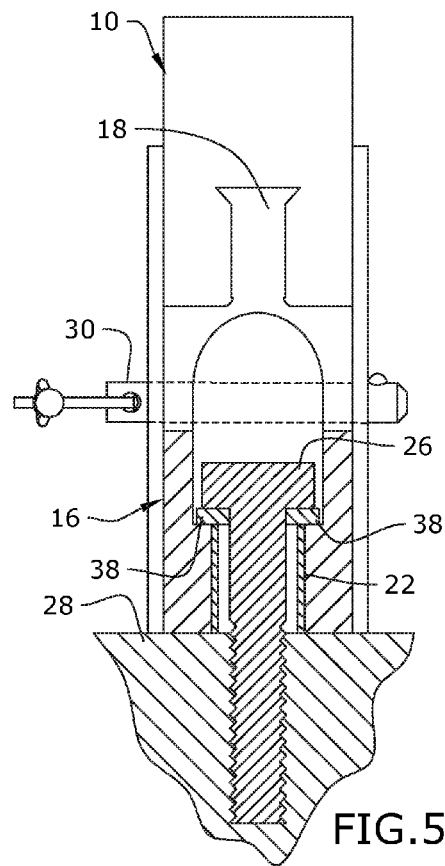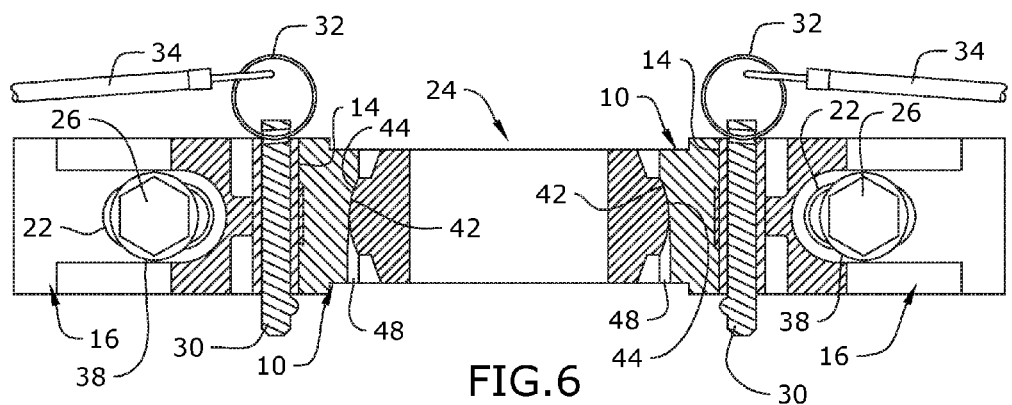

QUICK DISCONNECT PILLOW BLOCK BEARING

CROSS-REFERENCE TO RELATED APPLICATION

This application claims the benefit of priority of U.S. provisional application No. 62/333,315, filed May 9, 2016, the contents of which are herein incorporated by reference.

BACKGROUND OF THE INVENTION

The present invention relates to bearing assemblies and, more particularly to pillow block bearings.

Currently available pillow block bearings, such as used in conveyor systems, require weekly maintenance which requires the removal of multiple bolts and counterparts for repairs and greasing. More particularly, the pillow block bearings of the prior art require the removal of both lock collars and bolts for repairs. This results in unduly long and costly down times for these required maintenance services.

As can be seen, there is a need for a novel pillow block bearing which does not require weekly maintenance such as greasing and is readily and easily disassembled for deducing downtime necessary to conduct servicing and repairs.

SUMMARY OF THE INVENTION

In one aspect of the present invention, a quick release pillow block bearing assembly includes: a center bearing housing having a bore defined transversely through the housing configured to receive a bearing therein and a slot defined along an end face of the center bearing housing. An end housing has a rail defined along an inwardly facing surface of the end housing, the rail is configured to be received within the slot. A bearing housing aperture extends transversely through an axial face of the bearing housing and also extends into at least a portion of the slot. An associated end housing aperture is defined through at least a portion of the rail such that the end housing aperture and the bearing housing aperture are coaxially aligned when the rail is received within the slot. A retaining pin is dimensioned to be received through the bearing housing aperture and the end housing aperture. Preferably, the slot and the rail are configured to define a cooperating keyed joint.

In some embodiments, a slot extends into a bottom surface of the end housing and is configured to receive a fastener for securing the end housing to an installation structure. A boss may extend from an outer face of the end housing, wherein the slot may extend through the boss. The end housing may also have a pilot slot defined in a bottom surface of the end housing. Pillow block assembly may also include a bearing received within the bore. In preferred embodiments, the bearing is a swivel bearing.

In some aspects of the invention, the bore will include an annular ring portion defined into the face of the bore. Preferably, the annular ring portion is formed as a convex surface. In some embodiments, the bearing housing may also include at least one radial notch extending into a portion of the bore. These embodiments work with embodiments fitted with a bearing assembly having a tab extension, wherein the tab extension is received within the radial notch.

In other embodiments of the invention, the quick release pillow block assembly includes a center bearing housing having a transverse bore, where the center bearing housing is configured to be removably disposed between a pair of opposed end housings and joined with the end housing by a keyed joint. A bearing housing aperture extends transversely through a face of the bearing housing and at least a portion of the keyed joint. An end housing aperture is also defined transversely through the end housing and at least a portion of the keyed joint. In this embodiment, the end housing aperture and the bearing housing aperture are coaxially aligned when the bearing housing is received between the pair of opposed end housings. A release pin dimensioned to be received through the end housing aperture and the bearing housing aperture. When installed, a bearing is typically received within the bore.

The keyed joint may include a slot formed along a side surface of the bearing housing; and a rail defined along an inward facing surface of the end housing. Alternatively, the keyed joint may include a rail defined along a side surface of the bearing housing; and a slot formed along an inward facing surface of the end housing.

Aspects of the present invention also include a method of supporting a bearing assembly on a structure. The method entails attaching an end housing to the structure; joining a bearing housing to the end housing via a keyed joint defined between an end face of the bearing housing and an inwardly facing surface of the end housing; and inserting a retaining fastener through a bearing housing aperture extending transversely through a face of the bearing housing and at least a portion of the keyed joint and an end housing aperture defined transversely through the end housing and at least a portion of the keyed joint. Other aspects of the method include inserting a bearing in a bore extending transversely through the bearing housing.

These and other features, aspects and advantages of the present invention will become better understood with reference to the following drawings, description and claims.

BRIEF DESCRIPTION OF THE DRAWINGS

FIG. 4 is a section view of the pillow block bearing assembly taken along line 4-4 in FIG. 1.

FIG. 5 is a section view of the pillow block bearing assembly taken along line 5-5 in FIG. 1.

FIG. 6 is a section view of the pillow block bearing assembly taken along line 6-6 in FIG. 1.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, the present invention provides a quick release pillow block bearings assembly having end pieces, a center bearing housing carrying a bearing, and quick release pins. The invention enables replacement and or repair of the bearing and its counterparts easily, efficiently, and less often. The user need only remove two quick release pins to gain entry into the interior of the housing and have access to the bearing/shaft and counterparts. Upon removal of the quick release pins, the center housing bearing comes apart, and the end pieces stay in place, allowing one to remove and install the shaft and counterparts faster. It also enables removal of the shaft in seconds, thus permitting easy and quick replacement of worn sections of the bearing.

Figure 1:
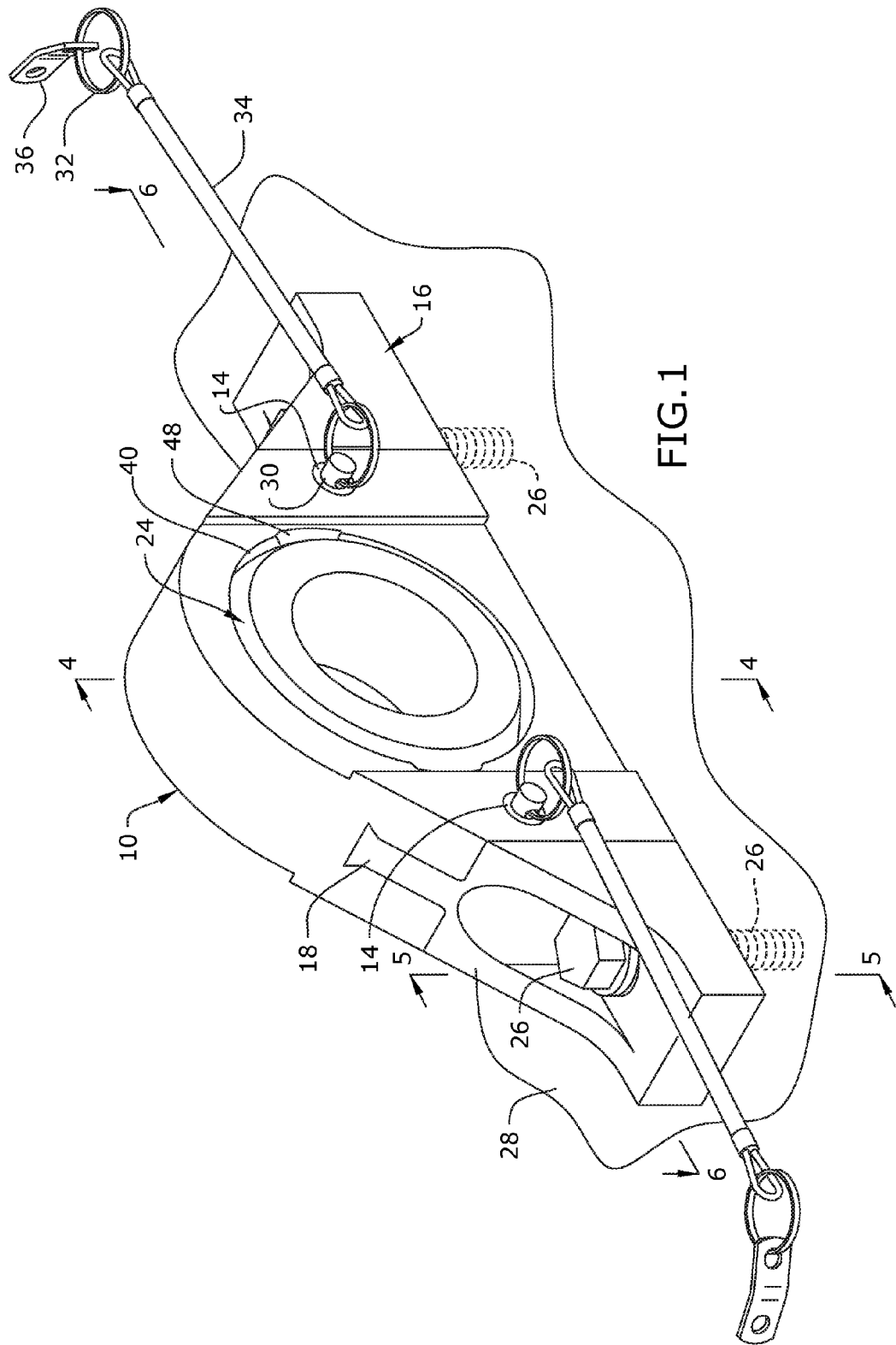
FIG. 1 is a perspective view of an embodiment of a quick release pillow block bearing assembly.
Figure 7:
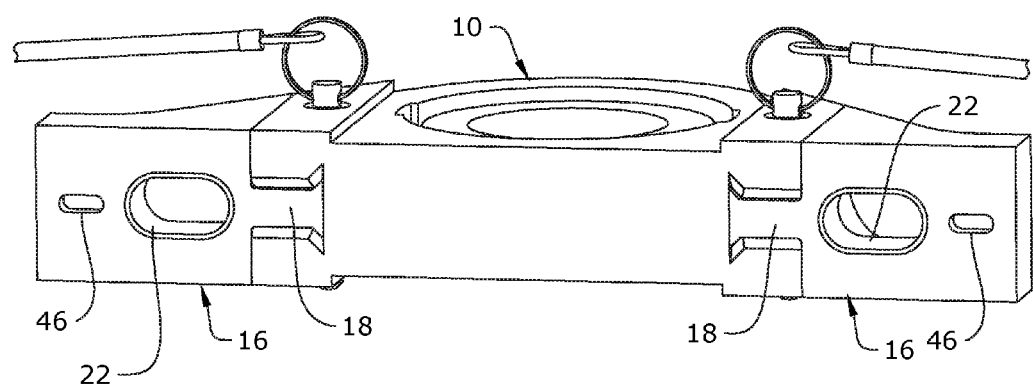
FIG. 7 is a bottom perspective view of the pillow block bearing assembly.

As seen in reference to FIG. 1, a quick release pillow block bearing assembly according to aspects of the present invention is illustrated. The assembly includes a center bearing housing 10 that is cooperatively received by a pair of end housings 16. The end housings 16 are mounted to a structural member 28 of the article of manufacture requiring the utilization of the pillow block bearing assembly. The housings 16 may be mounted to the structure 28 via a fastener 26, such as pins, bolts, rivets, welds, and the like, received in a slot 22 (FIG. 7) extending into an end housing 16 boss. The slot 22 may be fitted with a bushing. A bottom mating surface of the end housing 16 may also include a pilot slot 46 adapted to receive a pilot pin or protrusion extending from the mounting surface of the structural member 28 to facilitate alignment and positioning of the end housing 16 with the structure 28. The center bearing housing 10 carries a bearing 24, preferably a swivel bearing within a bore 40 extending transversely through the housing 10.

The center bearing housing 10 is cooperatively received by the end housings 16 via a cooperating keyed joint. In the embodiment depicted, the center bearing housing 10 has a keyed slot 12 defined in an end face of the housing 10 and the end housings 16 have a keyed extension, or joining rail 18 defined in an inwardly facing surface of the end housing 16. As will be appreciated, the configuration could be reversed and the specific shape or configuration of the keyed slot and extension could be varied. The keyed slot 12 and the keyed extension 18 are configured to permit the center bearing housing 10 to be readily removable without the need to detach the end housings 16 from the apparatus requiring the bearing assembly.

Figure 2:
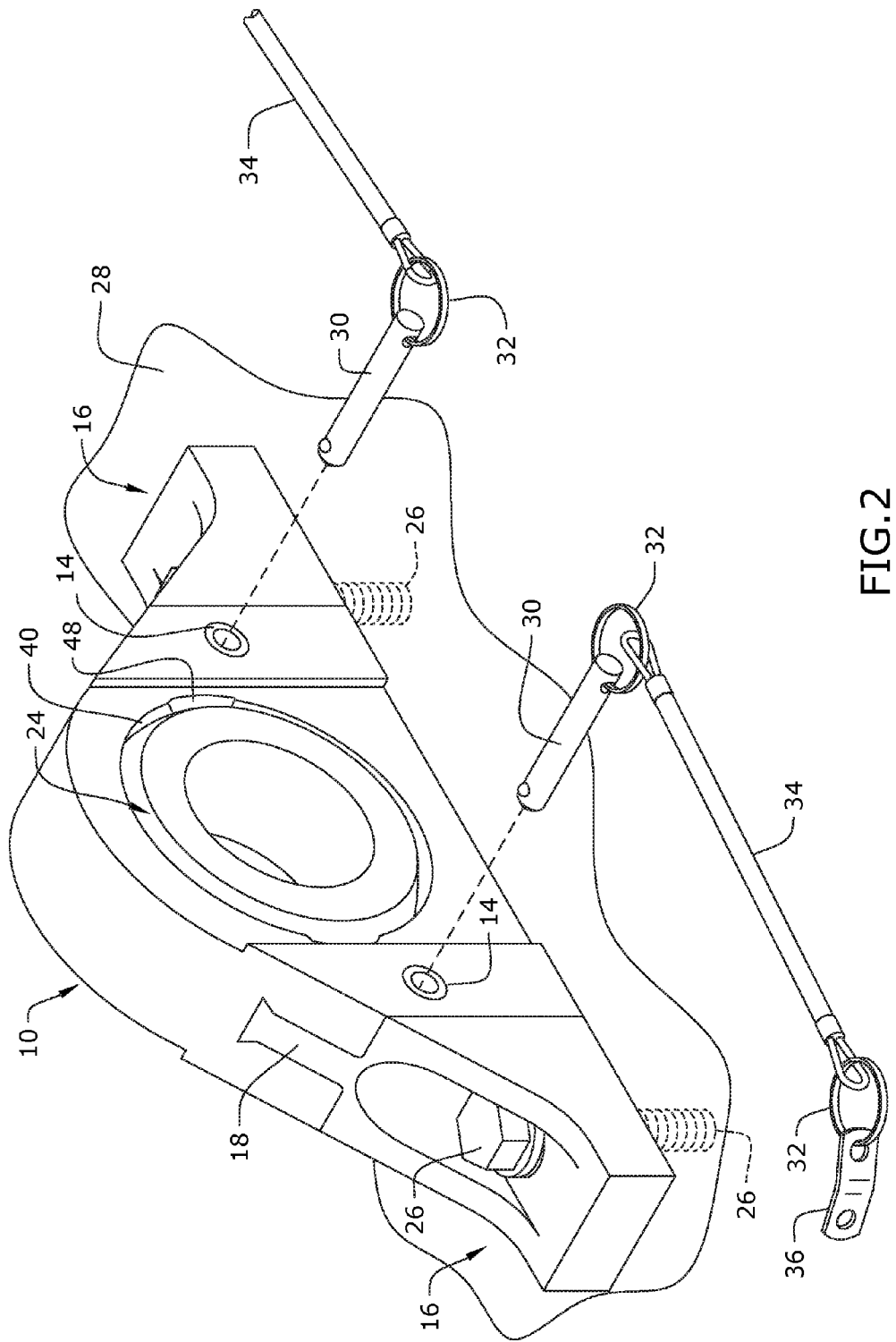
FIG. 2 is an exploded view of the pillow block bearing assembly.
Figure 3:
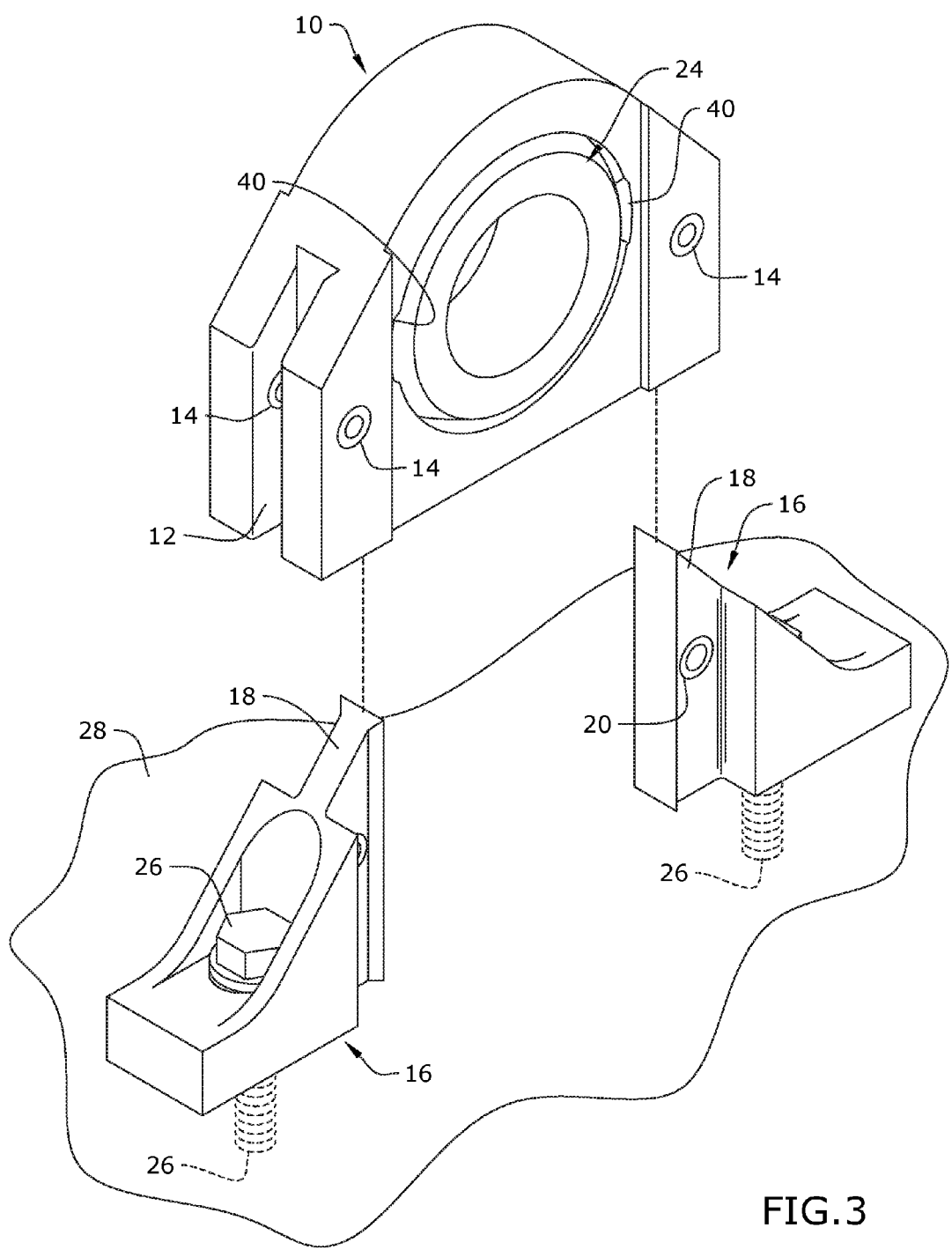
FIG. 3 is an exploded view of the pillow block bearing assembly.

As best seen in reference to FIG. 3, a bearing housing aperture 14 extends transversely through an axial faces of the bearing housing 10 and opens into at least a portion of the keyed slot 12. An associated end housing aperture 20 is defined through at least a portion of the keyed extension 18 such that the end housing aperture 20 and the bearing housing apertures 14 are coaxially aligned when the bearing housing 10 is received with the end housings 16. As seen in reference to FIG. 2, the bearing housing apertures 14 and the end housing aperture 20 are aligned to receive a pin 30 to secure the bearing housing 10 within the end housing 16. The pins are removable from the apertures 14, 20 so that the bearing housing 10 may be quickly removed from the end housings 16. In a preferred embodiment, the apertures 14 & 20 are fitted with a bushing.

The pin 30 may be retained in proximity to the pillow block assembly by a first end of a lanyard 34, which may be secured to the pin 30 by a slip ring 32 and a second end of the lanyard 38 may be attached to a retaining plate 36. The retaining plate 36 may be secured to one of the supporting structure 28, the end housing 16, or the bearing housing 10, or any suitable location proximal to the mounted bearing assembly.

As best seen in reference to FIGS. 4 and 6, the bore 40 receiving the bearing 24 may also include an annular ring portion 42 defined to extend into the face of the bore 40. The annular ring portion 42 is configured to cooperatively engage with and receive an annular extension portion 44 of the bearing assembly 24. Preferably the annular ring portion 42 is formed as a convex surface for cooperative engagement with a convex surface formed on the annular extension portion 44. In like manner, the bore 40 may also include at least one side notch 48 extending into a portion of the bore 40. The at least one side notch 48 may be provided to engage with a cooperating tab or protrusion extending from the bearing assembly 24 to facilitate radial alignment of the bearing assembly 24 within the bore 40. The foregoing configuration is preferred when utilizing an UHMW (ultra-high molecular weight polyethylene) bearing 24 in the pillow block assembly.

The quick-release pillow block assembly of the present invention allows installers and maintenance technicians to remove the center bearing housing 10 with the release of two pins 30. while leaving the end pieces 16 affixed and aligned in the apparatus. Once work is completed, the technician simply installs the center bearing housing 10 back in place and re-inserts the quick release pins 30. The technician may service the bearing 24 on-site or a replacement center bearing housing 10 may be installed while the removed center bearing housing 10 is returned to a shop facility for replacement of the bearing 24.

It should be understood, of course, that the foregoing relates to exemplary embodiments of the invention and that modifications may be made without departing from the spirit and scope of the invention as set forth in the following claims.

What is claimed is:

1. An apparatus, comprising:
    a center bearing housing having a bore defined transversely through the housing configured to receive a bearing therein and a slot defined along an end face of the center bearing housing;
    an end housing having a rail defined along an inwardly facing surface of the end housing, the rail configured to be received within the slot;
    a bearing housing aperture extending transversely through an axial face of the bearing housing and extending into at least a portion of the slot;
    an associated end housing aperture defined through at least a portion of the rail such that the end housing aperture and the bearing housing aperture are coaxially aligned when the rail is received within the slot.

2. The apparatus of claim 1, further comprising:
    a retaining pin dimensioned to be received through the bearing housing aperture and the end housing aperture.

3. The apparatus of claim 1, wherein the slot and the rail are configured to define a cooperating keyed joint.

4. The apparatus of claim 1, further comprising:
    a slot extending into a bottom surface of the end housing configured to receive a fastener for securing the end housing to an installation structure.

5. The apparatus of claim 4, further comprising:
    a boss extending from an outer face of the end housing, wherein the slot extends through the boss.

6. The apparatus of claim 5, further comprising:
    a pilot slot defined in a bottom surface of the end housing.

7. The apparatus of claim 5, further comprising:
    a bearing received within the bore.

8. The apparatus of claim 7, wherein the bearing is a swivel bearing.

9. The apparatus of claim 1, wherein the bore further comprises:
    an annular ring portion defined into a face of the bore.

10. The apparatus of claim 9, wherein the annular ring portion is formed as a convex surface.

11. The apparatus of claim 1, further comprising:
at least one radial notch extending into a portion of the bore.

12. The apparatus of claim 11, further comprising:
a bearing assembly having a tab extension, wherein the tab extension is received within the radial notch.

13. An apparatus, comprising:
a center bearing housing having a transverse bore, the center bearing housing configured to be removably disposed between a pair of opposed end housings and joined with the end housing by a keyed joint;
a bearing housing aperture extending transversely through a face of the bearing housing and at least a portion of the keyed joint;
an end housing aperture defined transversely through the end housing and at least a portion of the keyed joint, wherein the end housing aperture and the bearing housing aperture are coaxially aligned when the bearing housing is received between the pair of opposed end housings.

14. The apparatus of claim 13, further comprising:
a release pin dimensioned to be received through the end housing aperture and the bearing housing aperture.

15. The apparatus of claim 14, wherein the keyed joint comprises:
a slot formed along a side surface of the bearing housing; and
a rail defined along an inward facing surface of the end housing.

16. The apparatus of claim 14, wherein the keyed joint comprises:
a rail defined along a side surface of the bearing housing; and
a slot formed along an inward facing surface of the end housing.

17. The apparatus of claim 13, further comprising:
a bearing received within the bore.

18. A method of supporting a bearing assembly on a structure, comprising:
attaching an end housing to the structure;
joining a bearing housing to the end housing via a keyed joint defined between an end face of the bearing housing and an inwardly facing surface of the end housing; and
inserting a retaining fastener through a bearing housing aperture extending transversely through a face of the bearing housing and at least a portion of the keyed joint and an end housing aperture defined transversely through the end housing and at least a portion of the keyed joint.

19. The method of claim 18, further comprising:
inserting a bearing in a bore extending transversely through the bearing housing.

* * * * *